Oct. 31, 1967
L. RATTIN ETAL
3,350,004
PROGRAM CONTROL DEVICE FOR AN OFFICE MACHINE
Filed April 6, 1965
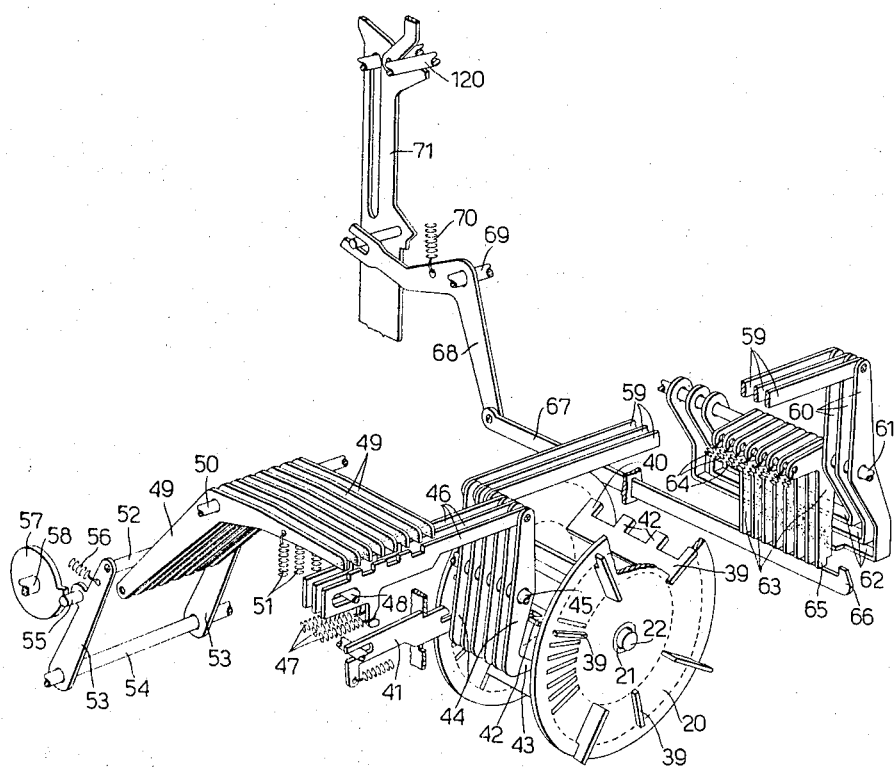
INVENTOR.
LUCIANO RATTIN
GIUSEPPE RICCIARDI
BY John Toggenburger
AGENT though the arms 42 of the plate 39 as are provided to
engage the cam projections 43, cause operations of the

United States Patent Office 3,350,004
Patented Oct. 31, 1967

3,350,004
PROGRAM CONTROL DEVICE FOR AN OFFICE MACHINE
Luciano Raitin and Giuseppe Ricciardi, Ivrea, Italy, assignors to Ing. C. Olivetti & C., S.p.A., Ivrea, Italy, an Italian corporation
Filed Apr. 6, 1965, Ser. No. 446,029
Claims priority, application Italy, Apr. 11, 1964, 8,353/64
7 Claims. (Cl. 235—60)

ABSTRACT OF THE DISCLOSURE

Relatively many function control members and/or stop members, the latter for signal printing control, are selectable variously through operations of relatively few permutation bars effected singly or in different combinations under the control of a movable program member having thereon discretely arranged program elements.

---

This invention relates to program control devices for office machines having a program device support which by movement to different control stations or positions is effective through selecting elements appropriately provided thereon to act selectively on a number of machine function control members.

In the known adding or accounting machine the program control device comprises a set of operation selecting elements, for example, provided on a conventional tabulating bar, and each such selecting elements is adapted to directly control its own related function control member. Therefore, in the case many functions are to be controlled, the program control device embodies many of said selecting elements so as to be heavy and to necessitate the slowing of machine operations.

The above and other disadvantages are obviated by the program control device according to the invention, which is very simple and reliable in operation. More particularly, the program control device is characterized in that many function control members are provided which are adapted to become selectively operated under the control of relatively few permutation members which are selectively and combinationally operable through movement of a program member to different control stations or positions, and in each of which positions program elements cause appropriate operations of the permutation members.

This and other characteristics of the invention will become apparent from the following description of a preferred embodiment thereof, and from the accompanying drawing showing a partial perspective view of an adding machine as seen from the rear and the right side thereof and having a program control device according to the invention.

The program control device is embodied in a printing adding machine comprising a usual cycling means including a cyclically rotatable main shaft 58, a set of conventional actuators not shown in the drawings for actuating accumulating and printing instrumentalities, and a movable part or slide 71 for control of a conventional symbol printing member, not shown. The actuators and the slide 71 are controlled by a universal bar 120 which normally holds them all down in retired positions, but is cyclically operable by the main shaft 58 of the stated conventional cycling means.

The program control device comprises a support in the form of a drum 20 which has thereon at a number of circumferentially spaced positions control units or plates 39 embodying discretely arranged control elements or projections 42. Said drum 20 is secured to a sleeve 21 by which it is rotatably mounted on a stationary pivot 22. Each control unit 39 has a stop 39, each one representing one of the stations of the device. Each projection 40 adapted to cooperate with a counterstop 41, in the manner described in the United States Letters Patent No. 3,121,487, in order to sequentially stop the drum 20 in successive function control positions or stations.

Each control unit 39 is provided with one or a plurality of elements or projections 42 discretely arranged in six different lanes. The projections 42 are adapted to cooperate with reading means afforded by a plurality of six cam projections 43 each one being part of an individual lever 44 and such levers are fulcrumed on a stationary shaft 45. Of the levers 44, there are connected individually to three related permutation bars 46 which govern mutually the operations of a greater number of function control members 49, and three are operatively communicative individually with three permutation bails 60 through links 59.

More particularly, the three rearmost levers 44 are linked with three corresponding differentialy notched permutation bars 46 which by slots are slidably mounted on a stationary shaft 48 and constantly urged by a spring 47 to transversely contact said shaft as shown in the drawing. The permutation bars 46 are adapted to be sensed by eight function control members, each being in the form of a lever 49 fulcrumed on a stationary shaft 50. Each lever 49 when rocked clockwise is adapted to control a corresponding machine function in a manner known per se. The levers 49 are normally urged by springs 51 individual spring thereto to contact a universal bar 52 secured to a pair of spaced arms 53 fulcrumed on a stationary shaft 54. One of the arms 53 is provided with a pin 55 and under the tension of a spring 56 contacts a cam 57 secured to the main shaft 58.

The three foremost levers 44 are connected each one through a link 59 to a related bail 60 and each such bail incorporates a permutation bar 62. Said bails 60 are pivotally supported on a stationary shaft 61 and their permutation bars 62 are differently notched for control of eight function control or stop members in the form of levers 63 fulcrumed on the shaft 61. The levers 63 are normally urged by individual springs 64 to contact the permutation bars 62, whereas the bails 60 under the urge of springs, not shown, but equivalent to the springs 47 for the permutation bars 46, normally contact a stationary stop member, not shown in the drawing.

Each lever 63 is provided with a projection 65 normally located on the path of a shoulder or sensing element 66 of a member or slide 67 which is adapted to be differentially settable departing from the rest position shown in the drawing. The slide 67 is linked with a lever 68 fulcrumed on a stationary pivot 69 and pin and slot connection with a machine part or slide 71 which is in control of a conventional symbol printing slide or member 71. A spring 70 associated with the lever 68 constantly urges the slide 71 upwardly, but the universal bar 120 in its normal position holds the slide 71 down and in turn holds the symbol printing member in retired position. It follows thus that the sensing member 66 is normally in the idle position seen in the drawing.

The program control device operates as follows.

In the drawing the drum 20 is in a position wherein no stop 40 is engaged with the counterstop 41. By rotating the drum 20 counterclockwise, the projection 40 of the first plate 39 moves into engagement with the counterstop 41 and causes the arrest of the drum 20 in its related program position or station. In this movement, such projections 42 of the plate 39 as are provided to engage the cam projections 43, cause operations of the corresponding levers 44 clockwise, whereby on one hand the permutation bars 46 are selectively displaced rightwards in the drawing, individually or in different combinations and, on the other hand the bails 60 are selectively rocked clockwise individually or in different combinations. The permutation bars 62 thus selectively rock all such of the members 63 as are required to establish a free path for movement of the sensing element 66 limitedly against a specific stop member 63.

Thereafter the main shaft 58 is conditioned for a machine cycle in a known manner. At the beginning of the machine cycle the cam 57 causes the spring 56 to rock the arms 53, and thus the universal bar 52, counterclockwise. The universal bar 52 causes thus the levers 49 to become individually downwardly urged by the springs 51 to sense the permutational control conditions established by the permutation bars 46, and it will be seen that any control member 49 which is permitted to descend will produce a function setting of the machine accordingly.

At the beginning of the machine cycle the universal bar 120 moves upwardly and press the movable machine part or slide 71 for upward movement. Thereby it causes the spring 70 to rock the lever 68 clockwise and to displace the slide 67 until its sensing element 66 is arrested by the projection 65 of the selected lever 63. The slide 71 is thus positioned for controling the symbol printing member in accord with the symbol that is programmed to be printed. The slide 67 and the lever 49 will become automatically cycle restored by the bars 120, and 52 respectively in a later cycle portion.

It is thus clear that relatively few program control elements 42 arranged in different combinations, through control over reading means 44 and permutation means 46, 62 are adapted to sequentially read and translate the control conditions represented by the elements 42 to cause a much greater number of function control members 49 and stop members 63 to be selectively and efficiently operated, whereby the program device can be of reasonably small dimension and weight so as to facilitate high machine speed with a minimum of wear, shock and noise.

It is intended that various modifications, improvements and additions of parts may be made to the described program control device without departing from the scope of the invention. For example the code bars 46 and 62 may be appropriately so shaped as to simultaneously select a combination of members 49, and 63 respectively, instead of a single member 49 and 63.

What we claim is:
1. In an office machine embodying a series of operable machine function control members, in combination;
   (a) portions on said control members disposed in a row,
   (b) a series of permutation members less in number than said control members extending parallel to the row of control members portions and adapted to be operated selectively and in different combinations for causing selective operations of said control members,
   (c) and a program device movable to different control positions to cause selective and combinational operations of said permutation members and in turn selective operations of said control members,
   (d) said program device including program elements discretely provided thereon for effecting in the different control positions thereof appropriately selective operations of said permutation members.

2. The invention set forth in claim 1,
   (e) and means to effect the operations of the permutation members by cam means individual thereto and adapted to be selectively acted upon by the elements discretely provided on the program device.

3. In an office machine embodying a machine cycling means and a series of operable machine function control members, in combination;
   (a) portions of said control members arranged parallel to each other in a row,
   (b) a series of permutation members less in number than said control members extending transversely of said member portions and adapted by being operated selectively and in different combinations to create different control conditions for selective operations of said control members,
   (c) a program device movable to different control positions and including program elements discretely provided thereon to cause by its movement to different control positions selective operations of said permutation members,
   (d) and means responsive to operations of said cycling means to effect control member operations in accord with whatever control condition has been created in each control position of said program device.

4. In an office machine embodying machine cycling means and a series of operable machine function control members, in combination;
   (a) portions of said control members arranged parallel to each other in a row,
   (b) individual springs tending to operate said control members,
   (c) means controlled by said cycling means to hold normally all control members in normal, ineffective positions but rendering them free for operation by their springs by action of the cycling means,
   (d) a series of permutation members less in number than said control members, extending transversely of said portions and by being operated selectively or in different combinations, creating different control conditions in respect to said control members by reason of which their springs will effect selective operations thereof when said cycling means is operated,
   (e) and a program device movable successively to different control positions and including program elements appropriately provided thereon so that responsive to movement of said program device to said different control positions said permutation members become operated selectively or in different combinations.

5. In an office machine embodying machine cycling means, and a machine part required to move to different positions, and means to move said machine part resiliently through operation of said cycling means, in combination;
   (a) a sensing element having operative connection with said movable machine part and being movable in a given path,
   (b) a series of stop members for intercepting said sensing element and arranged in a row along said path and individually movable into out of said path transversely thereof,
   (c) a series of operable permutation bars less in number than said stop members and when operated singly and in different combination being effective to position said stop members transversely of said path selectively to establish various limits of operation for said sensing element,
   (d) and a program device movable to different control positions and including program elements discretely provided thereon to cause by its movement to different control positions selective operations of said permutation members, whereby when said program device is in any control position and said cycling means is operated the said machine will move to a program established limit of operation for said sensing element.

6. In an office machine embodying machine cycling means, a machine part movable to different symbol selecting positions, and means to actuate said machine part resiliently to said symbol selecting positions through operation of said cycling means, in combination;

(a) a sensing element having operative connection with said movable machine part and being movable in a given path, (b) a series of stop members for intercepting said sensing element and normally all disposed in a row adjacent said path and individually movable into said path transversely thereof, (c) a series of operable permutation bails less in number than said stop members and when operated singly and in different combination being effective to position said stop members transversely of said path selectively to establish various limits of operation for said sensing element, (d) and a program device movable to different control positions and including program elements discretely provided thereon to cause by its movement to different control positions selective operations of said permutation bails, whereby when said program device is in any control position and said cycling means is operated the said machine part will move to a program-established limit of operation for said sensing element.

7. In an office machine embodying machine cycling means, a series of operable machine function control elements, and a machine part movable to different symbol selecting positions but being normally in a retired position, in combination;

(a) said control members having portions arranged in a row parallel to each other, (b) a first series of operable permutation bars less in number than said control members extending transversely of said member portions and adapted by being operated selectively in different combinations to create different control conditions for selective operations of said control members, (c) a sensing element having operative association with said movable machine part and movable in a given path, a series of stop members for intercepting said sensing element and arranged in a row along the path of movement of said sensing element, (d) a second series of operable permutation bars less in number than said stop members and adapted when operated selectively in different combinations to cause selective positioning of said stop members transversely of said path to establish various limits of operation for said sensing element, (e) a program device movable to different control positions and including program elements discretely provided thereon to cause by its movement to different control positions selective operations of the permutation bars of each said series, (f) cam elements individual to said permutation bars of each said series and operable by the program elements for effecting the operations of said permutation bars, (g) said cam elements arranged in a single row, (h) and the program elements active in the various control positions of said program device being arranged in rows on said program device, (i) means adapted to respond to said cycling means to effect control member operation in accord with the control condition afforded by the first series of permutation bars, (j) and means also adapted to respond to said cycling means to actuate said machine part resiliently to the limit afforded by the selective positioning of said stop members.

References Cited

UNITED STATES PATENTS

| | | | |
|---|---|---|---|
| 1,286,186 | 11/1918 | Miller | 197—84.3 |
| 2,229,762 | 1/1941 | Muller | 235—60.46 |
| 2,229,763 | 1/1941 | Muller | 235—60.42 |
| 2,755,019 | 7/1956 | Bringer et al. | 235—60.42 |
| 3,018,870 | 1/1962 | Lambert et al. | 197—84.3 |
| 3,045,798 | 7/1962 | Lambert et al. | 197—84.3 |

RICHARD B. WILKINSON, *Primary Examiner.*

STANLEY A. WAL, *Assistant Examiner.*